United States Patent
Nonaka et al.

(10) Patent No.: US 8,564,710 B2
(45) Date of Patent: Oct. 22, 2013

(54) PHOTOGRAPHING APPARATUS AND PHOTOGRAPHING METHOD FOR DISPLAYING INFORMATION RELATED TO A SUBJECT

(75) Inventors: Osamu Nonaka, Sagamihara (JP); Manabu Ichikawa, Hachioji (JP); Koichi Nakata, Kokubunji (JP)

(73) Assignee: Olympus Imaging Corp., Tokyo (JP)

( * ) Notice: Subject to any disclaimer, the term of this patent is extended or adjusted under 35 U.S.C. 154(b) by 61 days.

(21) Appl. No.: 13/234,308

(22) Filed: Sep. 16, 2011

(65) Prior Publication Data

US 2012/0069233 A1  Mar. 22, 2012

(30) Foreign Application Priority Data

Sep. 17, 2010  (JP) .................................. 2010-209777

(51) Int. Cl.
*H04N 5/222* (2006.01)
(52) U.S. Cl.
USPC ...... 348/333.02; 348/116; 382/103; 382/106; 382/113; 701/458; 701/459
(58) Field of Classification Search
USPC ............................ 348/333.02, 116, 143, 144; 345/629–633; 382/103, 106, 113; 701/436, 458, 459
See application file for complete search history.

(56) References Cited

U.S. PATENT DOCUMENTS

| | | | |
|---|---|---|---|
| 6,222,583 B1 * | 4/2001 | Matsumura et al. | 348/113 |
| 7,088,389 B2 * | 8/2006 | Shibasaki et al. | 348/239 |
| 2009/0083627 A1 * | 3/2009 | Onda et al. | 715/708 |
| 2009/0241039 A1 * | 9/2009 | Estevez et al. | 715/757 |
| 2010/0149399 A1 * | 6/2010 | Mukai et al. | 348/333.02 |
| 2010/0265177 A1 * | 10/2010 | Fujimoto et al. | 345/162 |

FOREIGN PATENT DOCUMENTS

| JP | 2004328077 A | * 11/2004 |
|---|---|---|
| JP | 2010-124185 | 6/2010 |
| JP | 2010124185 A | * 6/2010 |

* cited by examiner

*Primary Examiner* — Roberto Velez
*Assistant Examiner* — Quan Pham
(74) *Attorney, Agent, or Firm* — John C. Pokotylo; Straub & Pokotylo

(57) ABSTRACT

A digital camera includes: a display section displaying a photographing image obtained by photographing a subject; a signal processing and control section reading out information related to the subject and information related to surroundings of the subject from a database on the basis of position information and compass direction information about the digital camera; and a display control section selecting the information related to the subject according to the lens condition and performing control so as to display the selected information on the display section by superimposing the selected information on the photographing image.

18 Claims, 15 Drawing Sheets

PHOTOGRAPHING APPARATUS AND PHOTOGRAPHING METHOD FOR DISPLAYING INFORMATION RELATED TO A SUBJECT

CROSS REFERENCE TO RELATED APPLICATION

This application claims benefit of Japanese Application No. 2010-209777 filed in Japan on Sep. 17, 2010, the contents of which are incorporated by this reference.

BACKGROUND OF THE INVENTION

1. Field of the Invention

The present invention relates to a photographing apparatus and a photographing method, and in particular to a photographing apparatus and a photographing method capable of displaying information related to a subject.

2. Description of the Related Art

Conventionally, some photographing apparatuses such as digital cameras have a display device for confirming an image to be photographed, such as an LCD. A user, who is a photographer, can confirm an image to be photographed by seeing an image displayed on the display device.

Such a mobile communication terminal is disclosed that displays a name for an object existing in an observation direction in image information being photographed by automatically acquiring related information about the object, such as the name of the object (see, for example, Japanese Patent Application Laid-Open Publication No. 2010-124185).

This mobile communication terminal acquires a name of a subject retrieved from a map information database on the basis of position information about a place where the mobile communication terminal is currently located and compass direction information about the subject from the current position to combine the name of the subject with an image of the subject and performs control so as to display the name of the subject on a display device.

It is conceivable to, by applying the technique as disclosed in Japanese Patent Application Laid-Open Publication No. 2010-124185 to a photographing apparatus to combine information related to a subject with the subject to be photographed and displaying it on the display device of the photographing apparatus, double the pleasure of photographing, sufficiently confirming the subject.

SUMMARY OF THE INVENTION

A photographing apparatus which is one aspect of the present invention is a photographing apparatus capable of changing a lens condition for photographing a subject, the apparatus including: a display section displaying a photographing image showing the subject; a control section reading out information related to the subject and information related to surroundings of the subject from a database on the basis of position information and compass direction information about the photographing apparatus; and a display control section selecting the information related to the subject according to the lens condition and performing control so as to display the selected information on the display section by superimposing the selected information on the photographing image.

A photographing apparatus which is another aspect of the present invention includes: a display section displaying a photographing image showing the subject; a control section reading out map information recorded in a database on the basis of position information and compass direction information about the photographing apparatus; and a display control section performing control so as to display the read-out map information on the display section by superimposing the read-out map information on the photographing image.

A photographing method which is another aspect of the present invention is a photographing method for a photographing apparatus capable of changing a lens condition for photographing a subject, the method including: a display step of displaying a photographing image showing the subject, on a display section; a control step of reading out information related to the subject and information related to surroundings of the subject from a database on the basis of position information and compass direction information about the photographing apparatus; and a display control step of selecting the information related to the subject according to the lens condition and performing control so as to display the selected information on the display section by superimposing the selected information on the photographing image.

DETAILED DESCRIPTION OF THE PREFERRED EMBODIMENTS

Embodiments of the present invention will be described below with reference to drawings.

First Embodiment (Configuration)

Figure 1:
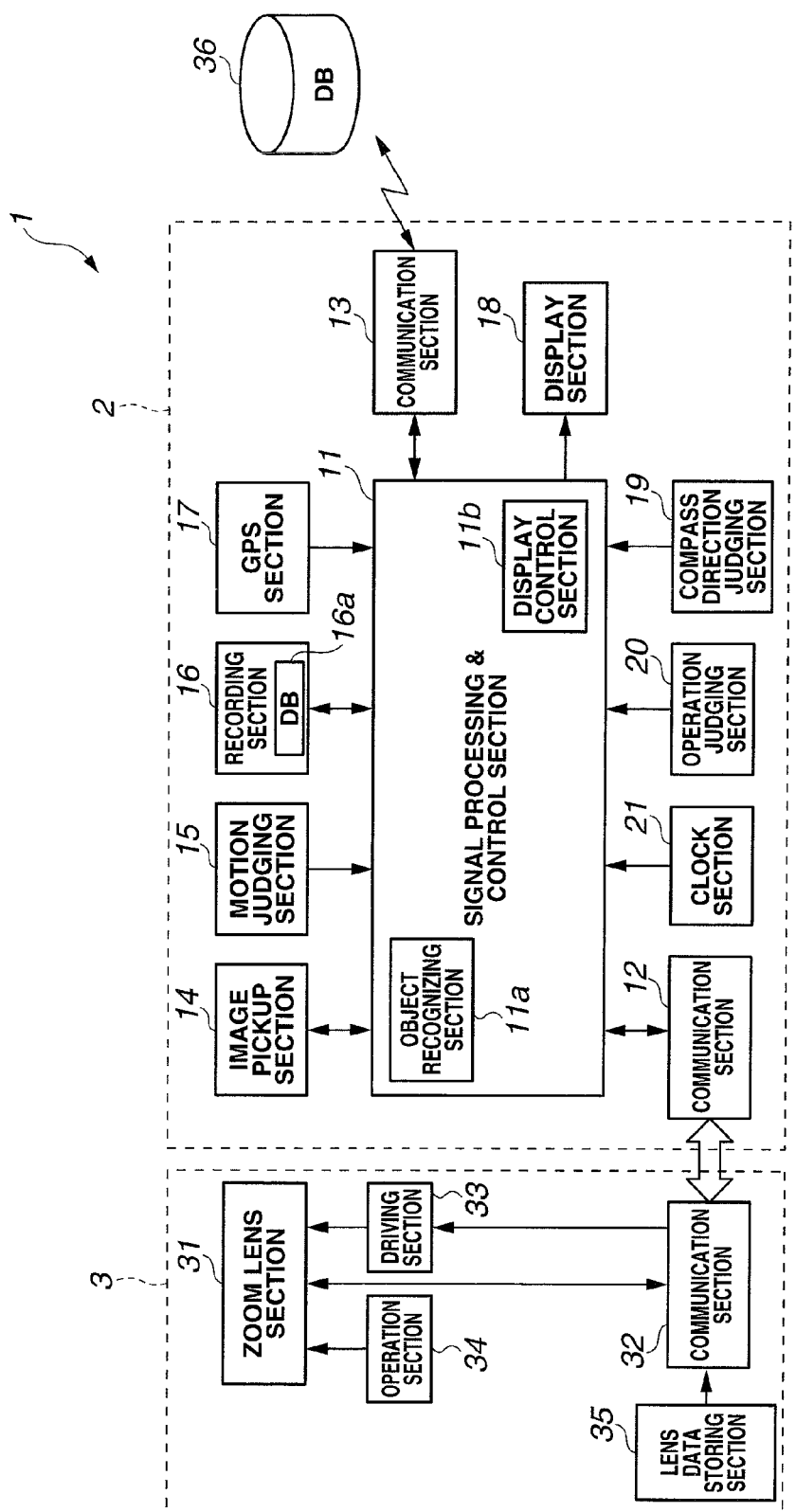
FIG. 1 is a block diagram showing the configuration of a digital camera according to a first embodiment of the present invention.

A digital camera 1 as a photographing apparatus of the present embodiment is a single-lens digital camera which includes a body section 2 the lens 3 of which is exchangeable. FIG. 1 is a block diagram showing the configuration of the digital camera according to the present embodiment.

In the description below, the photographing apparatus will be described as a single-lens digital camera. However, the photographing apparatus may be a so-called lens-unexchangeable camera, for example, a lens-integrated camera, a so-called compact camera or a mobile phone equipped with a camera having an angle-of-view adjustment function. The same goes for second and third embodiments.

As shown in FIG. 1, the digital camera 1 has a body section 2, which is a so-called body, and the lens 3.

The body section 2 is configured to include a signal processing and control section 11, communication sections 12 and 13, an image pickup section 14, a motion judging section 15, a recording section 16, a GPS section 17, a display section 18, a compass direction judging section 19, an operation judging section 20 and a clock section 21. Each of these sections is mounted on a circuit board in the body section 2.

The signal processing and control section 11 includes a central processing unit (hereinafter referred to as a CPU) and performs predetermined signal processing, for example, color signal generation processing, matrix conversion processing and other various digital processes on an image signal from the image pickup section 14. The signal processing and control section 11 is adjusted to be capable of outputting image information, voice information and the like which have been encoding-processed and compressed at the time of recording an image signal, a voice signal and the like. The signal processing and control section 11 is also adapted to be capable of decoding image information and voice information from the recording section 16 to obtain an image signal and a voice signal.

The CPU of the signal processing and control section 11 controls the operation of the whole digital camera 1. A software program executed by the CPU is stored in a ROM not shown.

The signal processing and control section 11 includes an object recognizing section 11a and a display control section 11b. The object recognizing section 11a and the display control section 11b may be software programs executed by the CPU or may be hardware circuits.

The control section 11 is provided with a focus control section enabling focus adjustment on the basis of change in contrast of multiple areas in a screen though the focus control section is not shown. The point may be selected by a photographer, or a nearest subject may be automatically selected by the camera. By detecting the brightness of the multiple areas and changing the diaphragm, shutter speed and sensitivity to perform appropriate exposure control, an amount of exposure of the whole or a certain part is suppressed to be within an appropriate range.

The object recognizing section 11a recognizes an object, such as the face of a person and the appearance of a building, from an image pickup signal obtained by the image pickup section 14.

The display control section 11b is a processing section which combines a tag or avatar information to be described later, which is related information related to a subject, with an image pickup result and performs control so as to display the combined image on the display section 18.

The communication section 12 is a circuit for performing various data communication with a communication section 32 (to be described later) of the lens 3.

The communication section 13 has a wireless communication function, and it is a circuit for performing data communication with a database 36 and the like via a communication line such as the Internet.

The image pickup section 14 is configured by an image pickup device such as a CCD or CMOS sensor. An optical image of a subject from the lens 3 is formed on an image pickup surface of the image pickup device constituting the image pickup section 14. Driving of the image pickup section 14 is controlled by the signal processing and control section 11. The signal processing and control section 11 outputs an image pickup device driving signal to the image pickup section 14 and captures an image signal which the image pickup device obtained by performing photoelectric conversion of the optical image.

The motion judging section 15 includes an acceleration sensor and the like and judges motions of the body section 2, for example, an elevation angle, an unintentional motion, an attitude and the like of the body section 2.

The recording section 16 is a circuit for recording image information and voice information from the signal processing and control section 11 onto a recording medium not shown. For example, a card interface can be adopted for the recording section 16, and the recording section 16 is capable of recording image information, voice information and the like onto a memory card or the like. The recording section 16 can also read out image information and voice information recorded on a recording medium and can provide the information to the signal processing and control section 11.

The recording section 16 has a database 16a. In the database 16a, map information, avatar information and the like are recorded. The map information, the avatar information and the like are read out by the signal processing and control section 11.

The GPS section 17 is a circuit for receiving a signal from a GPS system to acquire position information about the digital camera 1.

The display section 18 is configured by a display device such as a liquid crystal display (LCD), and it is a unit for displaying a photographing image and an auxiliary image to be described later in detail. The display section 18 is capable of displaying a picked-up image from the image pickup section 14 and a reproduced image from the recording section 16 provided to the display section 18 from the signal processing and control section 11. The display section 18 is also adapted to be capable of displaying a menu for operating the digital camera 1 by being controlled by the signal processing and control section 11

The compass direction judging section 19 is called an electronic compass or the like. The compass direction judging section 19 includes a geomagnetic sensor and the like and a sensor for judging a compass direction which is a direction the lens 3 of the digital camera 1 faces.

Figure 3A:
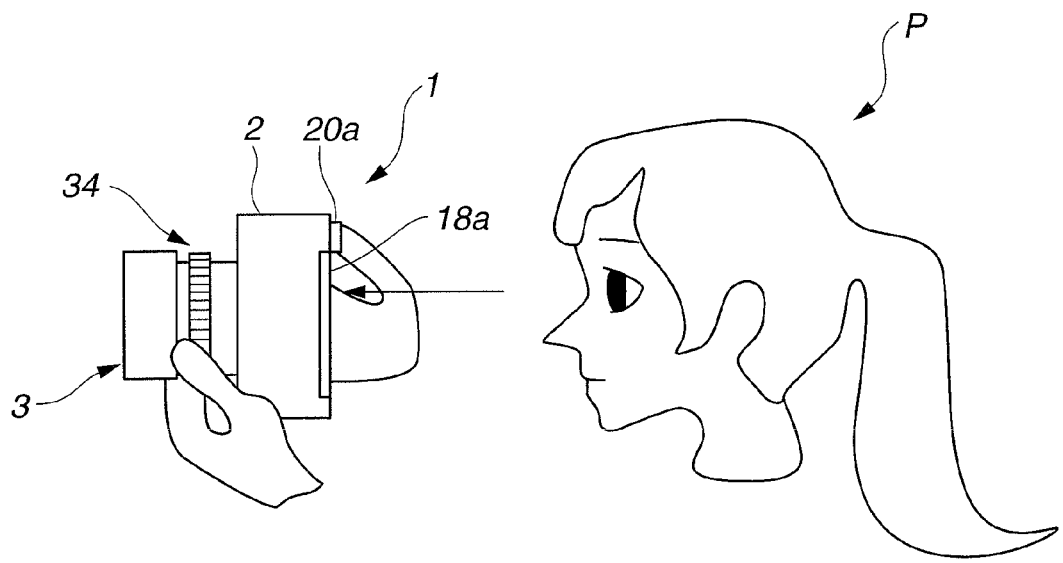
FIG. 3A is a diagram for illustrating a case of displaying a tag by combining the tag with a subject according to focus information.

The operation judging section 20 is a circuit for inputting an operation signal to an operation section 20a (see FIG. 3(a)), various switches, a touch panel and the like which are provided for the body section 2 to judge contents of various operations by a user. The operation judging section 20 is adapted to generate operation signals corresponding to various button operations by the user and output the operation signals to the signal processing and control section 11. The signal processing and control section 11 controls each of the sections on the basis of the operation signals.

The clock section 21 generates time information to be used by the signal processing and control section 11.

The lens 3 is configured to include a zoom lens section 31 (a single-focus lens is also possible), a communication section 32, a driving section 33, an operation section 34 and a lens data storing section 35.

The zoom lens section 31 has a zoom lens optical system and is also equipped with an auto-focus function of focusing on an image of a subject by being driven by the driving section 33. Though the zoom lens section 31 is described as having a zoom lens optical system in the present embodiment, the zoom lens section 31 is not limited thereto. For example, the zoom lens section 31 may be a single-focus lens section having a single-focus lens optical system.

The communication section 32 is a circuit for performing communication with the communication section 12 of the body section 2. When the lens 3 is fitted to the body section 2, multiple sections or multiple pins provided for each of the lens 3 and the body section 2 contact with each other, and transmission and reception of signals between the communication sections 12 and 13 is enabled. The communication section 32 can transmit information about the lens 3 which is stored in the lens data storing section, to the body section 2.

Since the lens 3 is an exchangeable lens, various kinds of lenses can be fitted to the body section 2. Therefore, information, such as magnification, focal distance and brightness (F value) as a zoom lens, differs among the multiple lenses to be fitted.

The driving section 33 is a circuit for driving the zoom lens section 31 in order to control a diaphragm, focus, an angle of view (zoom state) and the like of the zoom lens section 31. The zoom state, the focus state and the diaphragm of the zoom lens section 31 are detected by a detection section not shown, and the detected states and the like of the zoom lens section 31 are transmitted to the body section 2 via the communication section 32. The focus control and the exposure control described before are performed by this lens communication.

The operation section 34 is a zoom ring or a zoom switch of the lens 3, and the user can zoom the lens 3 by operating the operation section 34. An operation section enabling manual adjustment of the focus position and the diaphragm may be provided. Such specifications are also possible that the variables can be automatically changed according to scenes.

In the lens data storing section 35, information, such as the diaphragm, focus, angle of view, aberration and the like of the lens 3, is recorded.

Therefore, the digital camera 1 is capable of processing of a time-varying image and a still image on the basis of an image pickup signal from the image pickup section 14, by the signal processing and control section 11, the recording section 16 and the display section 18. That is, the signal processing and control section 11 generates a video signal of a time-varying image by performing predetermined signal processing on the image pickup signal from the image pickup section 14 and gives the video signal to the display section 18 to display the video signal. The signal processing and control section 11 also compresses the generated video signal and gives it to the recording section 16. The recording section 16 can record the video signal from the signal processing and control section 11 onto a recording medium not shown and can read out a video signal recorded in a recording medium and output the video signal to the signal processing and control section 11. The signal processing and control section 11 can decode the video signal from the recording section 16 and give it to the display section 18 of the body section 2 to display the video signal.

Figure 2A:
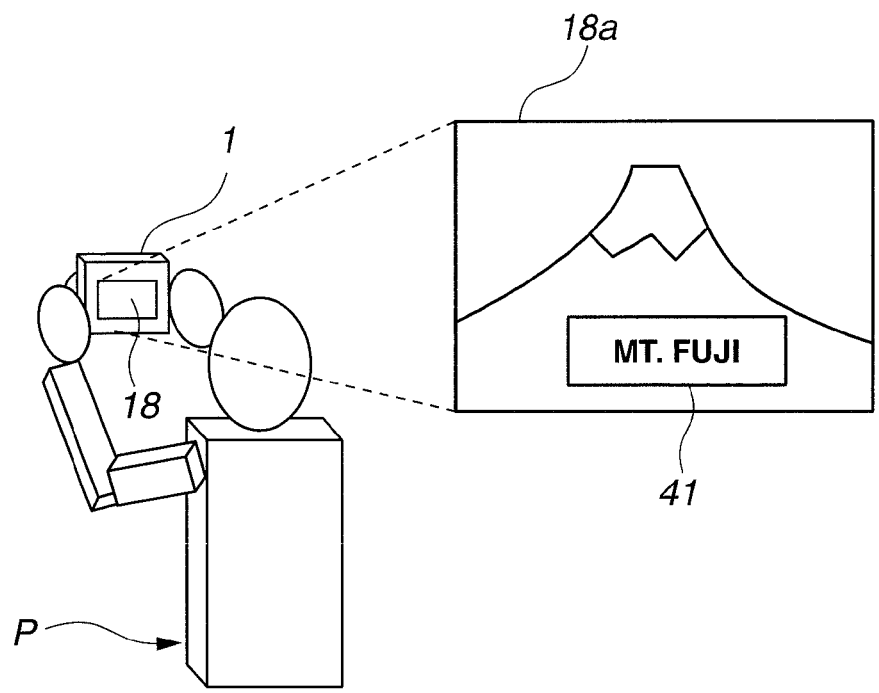
FIG. 2A is a diagram for illustrating a case of displaying a tag by combining the tag with a subject.
Figure 2B:
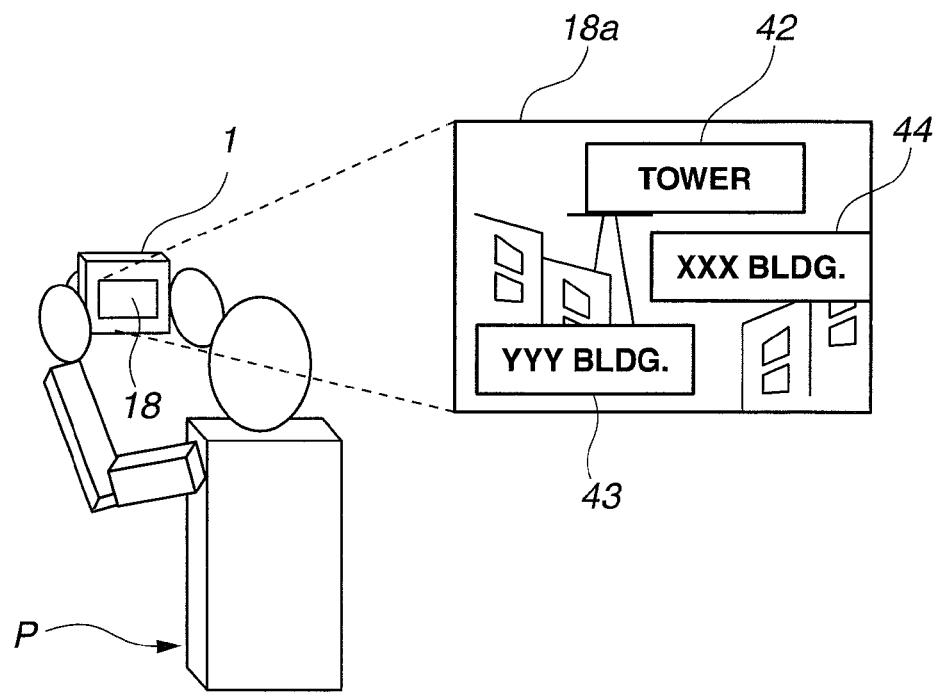
FIG. 2B is a diagram for illustrating a case of displaying a tag by combining the tag with a subject.

FIGS. 2A and 2B are diagrams for illustrating a case of displaying a tag by combining the tag with a subject.

When an AR (Augmented Reality) display mode is set by a user P, the signal processing and control section 11 refers to map information in the database 16a and reads out a tag for explaining a subject, on the basis of position information about the digital camera 1 from the GPS section 17 and compass direction information from the compass direction judging section 19. The AR display mode is set by the user P operating the operation section 20a of the body section 2 or the operation section 34 of the lens 3 shown in FIG. 3A to be described later. The display control section 11b can display the tag read out by the signal processing and control section 11 on a display screen 18a.

As shown in FIG. 2A, when the user P photographs Mt. Fuji as an example of a subject, a tag 41, which is information for explaining the subject, that is, information related to the subject, is displayed on the display screen 18a of the display section 18, being combined with the subject.

However, as shown in FIG. 2B, when the user P performs photographing at a chaotic place in a town, multiple tags 42 to 44, which are information about subjects, are displayed on the display screen 18a of the display section 18, being combined with the subjects. In this case, the multiple tags 42 to 44 occupy a lot of part of the display screen 18a and interfere with photographing of the subjects.

Figure 3B:
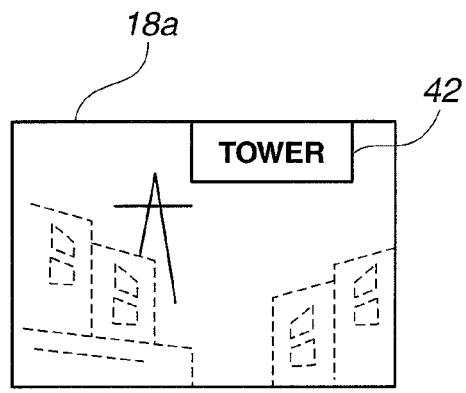
FIG. 3B is a diagram for illustrating a case of displaying a tag by combining the tag with a subject according to focus information.

FIGS. 3A and 3B are diagrams for illustrating a case of displaying a tag by combining the tag with a subject according to focus information.

The display control section 11b selects only information related to a subject according to position information about the digital camera 1 from the GPS section 17, compass direction information from the compass direction judging section 19 and focus information from the lens 3, and displays the information on the display screen 18a. Information related to surroundings of the subject is not selected and not displayed on the display screen 18a.

Figure 3C:
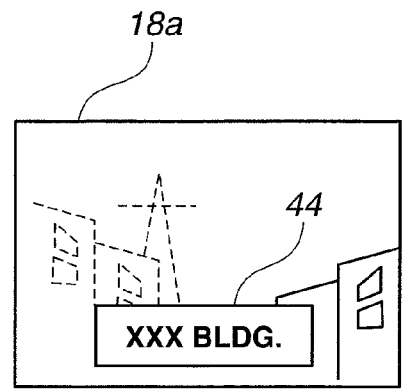
FIG. 3C is a diagram for illustrating a case of displaying a tag by combining the tag with a subject according to focus information.

As shown in FIG. 3A, the user P operates the operation section 20a of the body section 2 or the operation section 34 of the lens 3 while seeing a photographing image displayed on the display screen 18a of the display section 18 at the back of the body section 2. If the user P focuses the digital camera 1, for example, on a tower in the distance, only the tag 42 related to the tower in the distance is displayed on the display screen 18a in response to the operation as shown in FIG. 3B. If the user P focuses the digital camera 1, for example, on the XXX Building at a short distance, only the tag 44 related to the XXX Building at a short distance is displayed on the display screen 18a in response to the operation as shown in FIG. 3C. The tags 42 and 44 shown in FIGS. 3B and 3C may be three-dimensionally displayed.

Thus, the digital camera 1 of the present embodiment is adapted to display only tag information required by the user P on the display screen 18a of the display section 18 in response to the user P's lens operation (an operation of the operation section 34). Since tag information related to a focused subject is displayed on the display screen 18a in response to a lens operation (an operation of the operation section 34), the user P can easily look for a subject he or she is interested in.

This focus adjustment operation is performed by a lens operation here. However, it is also possible for the control section 11 of the camera to judge contrast information about each part of a photographing image as described before so that the focus adjustment operation may be performed by autofocusing. In this case, since it is possible to preferentially select a point for focus adjustment from among multiple points in the screen, chaotic display may be prevented by selecting related information about the selected point or area.

Naturally, when there are subjects with various brightnesses in the screen, overexposure or underexposure is caused at some places. Therefore, a selection may be made so that only related information about an appropriate exposure point or area is displayed.

By causing an area targeted by focus adjustment and an area targeted by exposure adjustment to correspond to each other, information can be narrowed down only to information about the area which the user is interested in and displayed. Identification of such an area may be automatically performed by the camera or may be selectable by the user using a switch or the touch panel.

Figure 4:
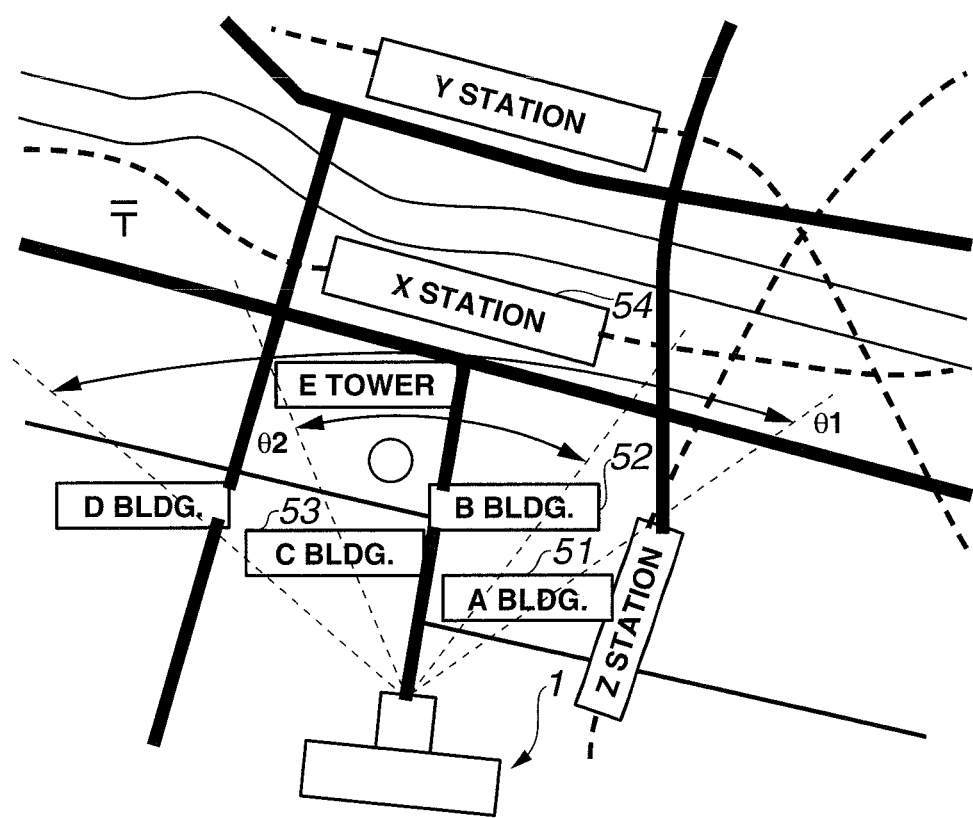
FIG. 4 is a diagram for illustrating a case of displaying information related to a subject according to angle-of-view information.
Figure 5:
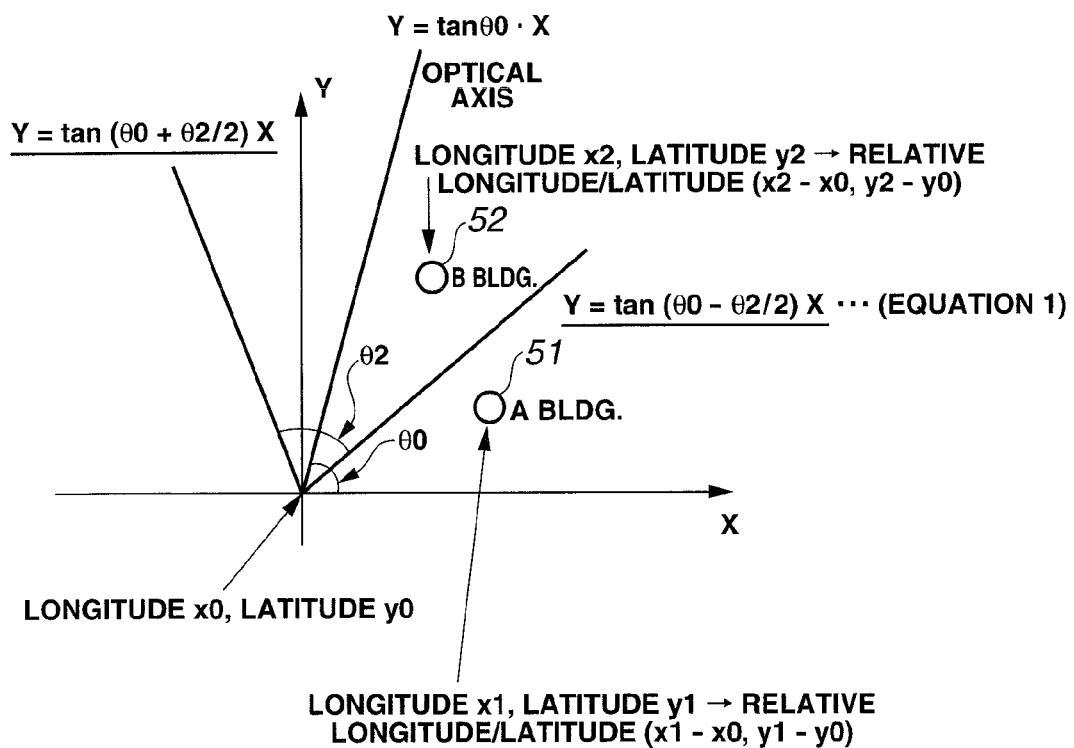
FIG. 5 is a diagram for illustrating a case of displaying information related to a subject according to angle-of-view information.

FIGS. 4 and 5 are diagrams for illustrating a case of displaying information related to a subject according to angle-of-view information.

When the user P aims the digital camera 1 in a direction shown in FIG. 4, the GPS section 17 and the compass direction judging section 19 detects the position (a longitude x0, a latitude y0) and direction θ0 of the digital camera 1, respectively. When the user P zooms the lens 3 to change an angle of view θ1 to an angle of view θ2, the signal processing and control section 11 calculates (Equation 1) in FIG. 5 in consideration of the angle of view θ2.

The signal processing and control section 11 determines a relative longitude (x1-x0) and relative latitude (y1-y0) of A Building 51 on the basis of a longitude x1 and latitude y1 of A Building 51, with a longitude x0 and latitude y0 of the digital camera 1 used as a reference. Similarly, the signal processing and control section 11 determines a relative longitude (x2-x0) and relative latitude (y2-y0) of B Building.

The signal processing and control section 11 judges whether latitudes obtained by substituting the relative longitudes of A Building 51 and B Building 52 determined in this way into (Equation 1) in FIG. 5 are smaller than the relative latitudes of A Building 51 and B Building 52, respectively. If the latitudes obtained by substitution into (Equation 1) in FIG. 5 are smaller than the relative latitudes, the buildings are candidates for being displayed within a photographing range. Therefore, A Building 51 is not a photographing target, while B Building 52 is a photographing target. As a result, a tag related to A Building 51 is not displayed on the display screen 18a, but a tag related to B Building 52 is displayed on the display screen 18a.

Figure 6:
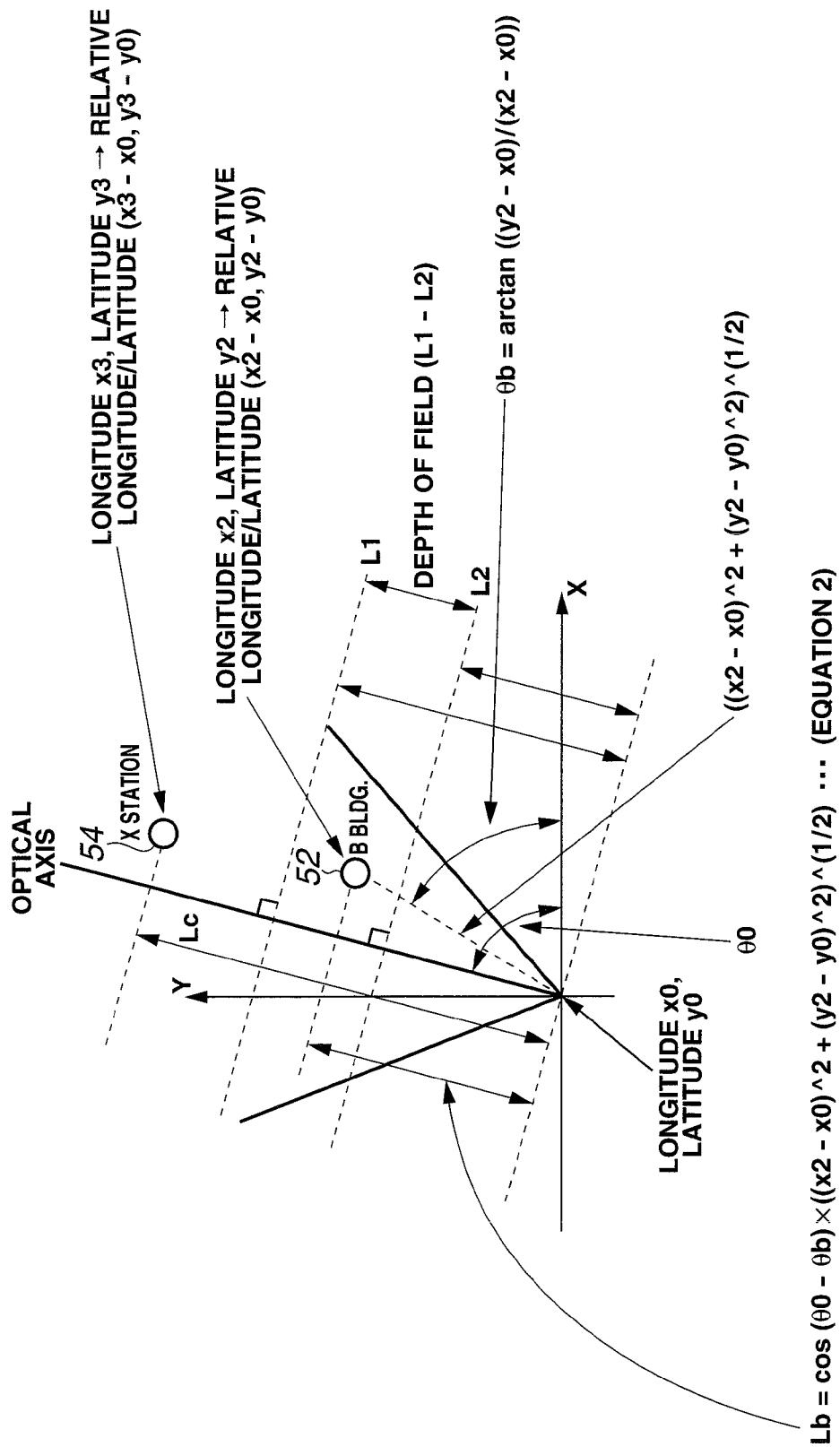
FIG. 6 is a diagram for illustrating a case of displaying information about a subject according to focus and diaphragm information.

FIG. 6 is a diagram for illustrating a case of displaying information about a subject according to focus and diaphragm information.

The signal processing and control section 11 judges whether or not a distance Lb of B Building 52 as a subject and a distance LC of X Station satisfy display conditions on the basis of focus positions L1 and L2 set by the digital camera 1 or the lens 3, or a depth of field (L1-L2) by the diaphragm.

The distance of B Building 52 can be calculated by (Equation 2) in FIG. 6. Therefore, the signal processing and control section 11 compares the calculated distance with a distance width added with a focusing distance determined by the focus positions or the depth of field determined by the diaphragm. Then, if the signal processing and control section 11 judges that B Building 52 exists within the distance width added with the focusing distance or the depth of field, the signal processing and control section 11 causes the tag related to B Building 52 to be displayed on the display screen 18a.

Next, it will be described to display avatar information.

FIGS. 7A to 7D are diagrams for illustrating a case of displaying avatar information by superimposing the avatar information on a subject. Here, the avatar information is information expressing a person, such as a subject and a photographer, by a simplified graphic, and it is obtained by reading out corresponding digital data from the recording section and combining the digital data as an image as appropriate. In the case of a subject, it is, of course, possible to form an avatar image by extracting the characteristics of the subject, simplifying the contour or combining face parts. A part of a photographing image may be sliced and used.

Figure 7A:
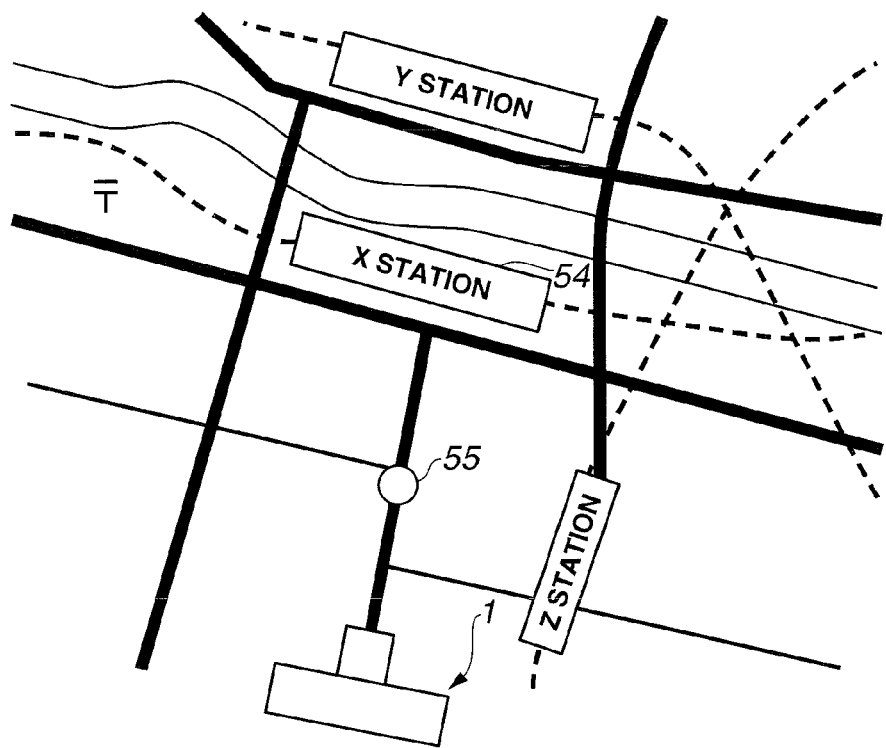
FIG. 7A is a diagram for illustrating a case of displaying avatar information by superimposing the avatar information on a subject.
Figure 7B:
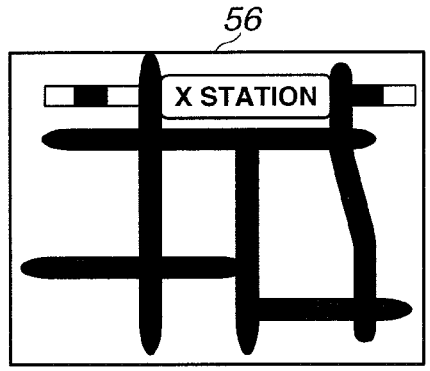
FIG. 7B is a diagram for illustrating a case of displaying avatar information by superimposing the avatar information on a subject.

As shown in FIG. 7A, in the case of photographing a subject 55 with the digital camera 1, the position and compass direction of the digital camera 1 is detected by the GPS section 17 and the compass direction judging section 19. The signal processing and control section 11 detects at which position on a map photographing is to be performed, from the position and compass direction information, and reads out information 56, such as a simple map, about a corresponding place from the database 16a as shown in FIG. 7B. More specifically, the signal processing and control section 11 may obtain the simple map information 56 by slicing a predetermined range from map information (including an aerial photograph and a satellite photograph in addition to an ordinary map) recorded in the database 16a, according to depth of field in addition to the position and compass direction information. What is already prepared as a vicinity map by a nearby landmark station, a store within a photographing range, a neighboring public institution or company, or the like may be used. A range which includes a nearby landmark (a representative position on the map, such as the station shown in this figure) may be sliced from a large map and used. Of course, in any of the cases, it is more preferable that a building being photographed is included within the range.

The display range of this map may include at least a range included in the angle of view of a photographing lens, between the focus positions L1 and L2, which is shown in FIG. 6. Due to such devising, the width of a map is widened or narrowed according to an angle of view set for the photographing lens, and it is possible to display a map in consideration of a photographer's attention point by widening the map when the angle of view is wide and narrowing the map when the angle of view is narrow.

Figure 7C:
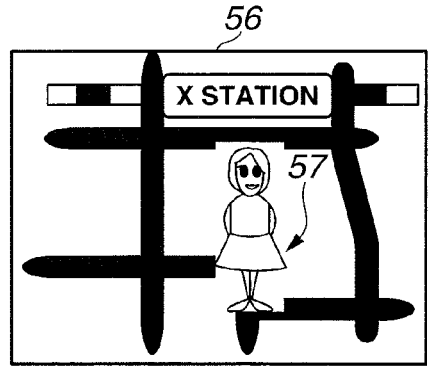
FIG. 7C is a diagram for illustrating a case of displaying avatar information by superimposing the avatar information on a subject.

The object recognizing section 11*a* detects whether or not avatar information corresponding to the subject 55 is recorded in the database 16*a*. If the object recognizing section 11*a* detects that the avatar information corresponding to the subject 55 is recorded in the database 16*a*, the signal processing and control section 11 combines avatar information 57 at a corresponding position on the simple map information 56 as shown in FIG. 7C.

Figure 7D:
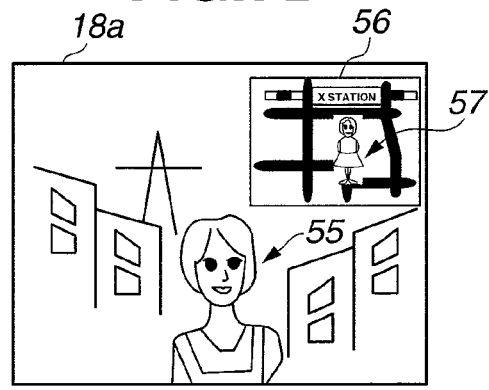
FIG. 7D is a diagram for illustrating a case of displaying avatar information by superimposing the avatar information on a subject.

The display control section 11*b* iconifies the combined simple map information 56 and avatar information 57, and displays the icon by superimposing the icon on a photographing image as shown in FIG. 7D. Thereby, the user P can perform photographing, not only merely grasping names of individual subjects but also grasping the state at the time of photographing including his or her position and a surrounding environment. That is, the user P can recognize that the photographing location is near X Station by seeing the simple map information 56 though X Station is not seen on the photographing image in FIG. 7D. Thereby, it is possible to take a better commemorative picture in consideration of missed things or a background hidden behind pedestrians or persons.

It is effective for enriching a memory to include a landmark within the range, as described above.

Thus, image information from different viewpoints indicating a photographing state is acquired or generated, and it becomes possible to display the photographing state with multiple pieces of rich information by displaying or recording the image information together with an image on a screen to be actually photographed.

In conventional cameras, only an image obtained via a photographing lens can be displayed. However, according to this invention, it is possible to present sufficient information by displaying images obtained from different viewpoints, which could not be obtained as images by conventional cameras. Therefore, this map information is not limited to a simple map. In addition to an ordinary map, an aerial photograph or a satellite photograph may be used instead.

That is, in addition to attaching a text on an actual image as in FIG. 2, intelligent display is also possible in which image information related to the whole scene is attached. Thereby, it is possible to provide richer information and enhance the value of information provision and the richness of an image at the time of photographing. By displaying a photographer's avatar and the like at a photographing position, the relationship between a subject and the photographer can be recorded, and a memory can be enriched. As more detailed photographing information, the information can enhance the value of a picture as recording information.

It is possible not only to enhance the value as recording information but also to easily adjust the direction of photographing and acquire an image on which landmark information is recorded by performing photographing while seeing such a combined image (Process)

Figure 8:
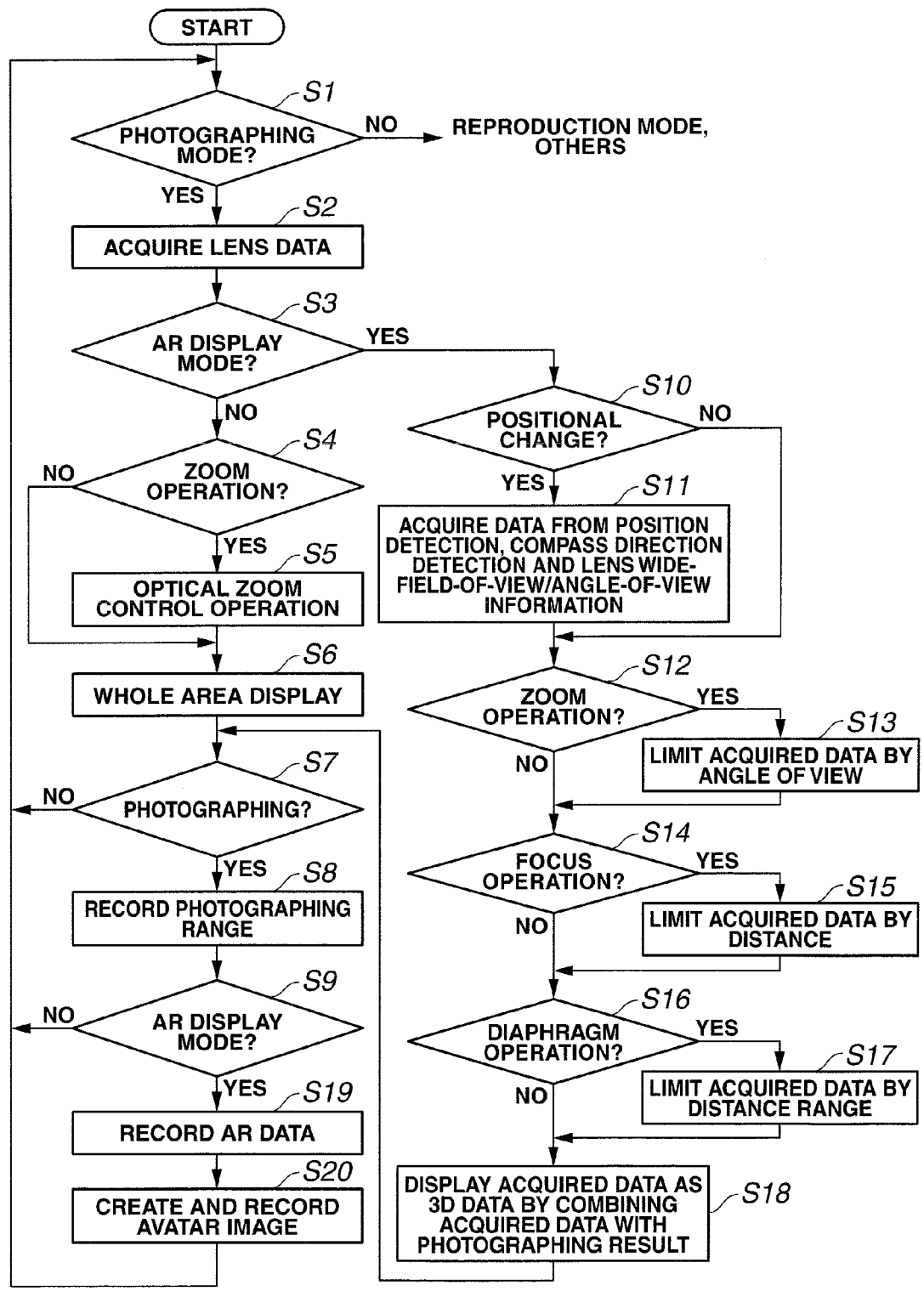
FIG. 8 is a flowchart showing an example of a process flow of a digital camera 1 at the time of photographing.

Next, a process performed at the time of photographing by the digital camera 1 will be described. FIG. 8 is a flowchart showing an example of a process flow of the digital camera 1 at the time of photographing. The process of FIG. 8 is executed by the CPU of the signal processing and control section 11. A program for the process of FIG. 8 is recorded in a ROM (not shown) in the signal processing and control section 11.

When the digital camera 1 is powered on, the CPU judges whether or not a photographing mode is set by the user (S1). If the photographing mode is not set (S1: NO), a process of another mode, for example, a reproduction mode process is executed.

If the photographing mode is set (S1: YES), the CPU acquires various data about the lens 3 (S2) and judges whether an AR display mode is set or not (S3). The AR display mode is set by the user P operating the operation section 20*a* of the body section 2 or the operation section 34 of the lens 3. This AR display mode is a mode for superimposingly displaying AR information, that is, information related to a subject, on the subject virtually really. It is judged whether or not the digital camera 1 is set to the AR display mode by the user. The AR display mode is called so because actual information becomes rich contents by combining digital information, such as a tag and an avatar, with the data of an actual image and it appears as if the reality was augmented. Here, the digital information superimposedly displayed on an actual image is called "AR data".

If the digital camera 1 is not set to the AR display mode (S3: NO), the CPU judges whether a zoom operation has been performed or not (S4). If a zoom operation has been performed (S4: YES), the CPU executes an optical zoom control operation (S5) and displays the whole area (S6). The whole area display means to display an image obtained by performing photographing with the image pickup device of the image pickup section 14, on the display screen 18*a* of the display section 18. If a zoom operation has not been performed (S4: NO), the CPU executes the whole area display (S6).

Next, it is judged whether a photographing button has been pressed or not (S7). If the photographing button has been pressed (S7: YES), the CPU stores an image within a photographing range (S8). If the photographing button has not been pressed (S7: NO), the process returns to S1. The CPU, judges whether the AR display mode is set or not (S9). If the digital camera 1 is not set to the AR display mode (S9: NO), the process returns to S1. A process performed at the time when the digital camera 1 is set to the AR display mode will be described from the processing at S3.

If the digital camera 1 is set to the AR display mode (S3: YES), the CPU judges whether the position of the digital camera 1 has changed or not (S10). If the position has changed (S10: YES), the CPU acquires necessary data, among position detection, compass direction detection and lens wide-field-of-view/angle-of-view information, from the database 16*a* (S11) and judges whether a zoom operation has been performed or not (S12). If the position has not changed (S10: NO), the CPU judges whether a zoom operation has been performed or not (S12). This zoom operation is performed by the user P operating the operation section 20*a* of the body section 2 or the operation section 34 of the lens 3. If a zoom operation has been performed (S12: YES), the CPU limits the acquired data by an angle of view (S13) and detects whether a focusing operation has been performed or not (S14). If a zoom operation has not been performed (S12: NO), the CPU detects whether a focusing operation has been performed or not (S14). This focusing operation is performed by the user P operating the operation section 20*a* of the body section 2 or the operation section 34 of the lens 3. If a focusing operation has been performed (S14: YES), the CPU limits the acquired data by a distance (S15) and detects whether a diaphragm operation has been performed or not (S16).

If overexposure or underexposure is caused at some places in the screen by exposure control such as the diaphragm operation, a selection may be made so that only related information about an appropriate exposure point or area is displayed.

If a focusing operation has not been performed (S14: NO), the CPU judges whether a diaphragm operation has been performed or not (S16). The diaphragm operation is performed by the user P operating the operation section 20a of the body section 2 or the operation section 34 of the lens 3. If a diaphragm operation has been performed (S16: YES), the CPU limits the acquired data by a distance range (S17) and displays the data as 3D data on a photographing result by combining the data with the photographing result (S18). If a diaphragm operation has not been performed (S16: NO), the CPU displays the data as 3D data on the photographing result by combining the data with the photographing result (S18). In the processing at S18, the simple map information 56 shown in FIG. 7D may be combined with the photographing result and displayed.

The focus adjustment operation at S14 is performed by a lens operation here. However, it is also possible for the control section 11 of the camera to judge contrast information about each part of a photographing image as described before so that the focus adjustment operation may be performed by autofocusing. In this case, since it is possible to preferentially select a point for focus adjustment from among multiple points in the screen, chaotic display may be prevented by selecting related information about the selected point or area.

By causing an area targeted by focus adjustment and an area targeted by exposure adjustment to correspond to each other, information can be narrowed down only to information about the area which the user is interested in and displayed. Identification of such an area may be automatically performed by the camera or may be selectable by the user using a switch or the touch panel.

Thereby, the user P can confirm information which cannot be confirmed on a photographing image, information about X Station here, from the simple map information 56.

After the processing at S18, it is judged by the processing at S7 whether the photographing button has been pressed or not. If it is judged at S7 that the photographing button has been pressed, the CPU stores an image within the photographing range.

Then, if the digital camera 1 is set to the AR display mode (S9: YES), the CPU records the data (S19). The CPU creates an avatar image (S20), and the process returns to S1.

It is assumed that the avatar information is obtained by referring to a database for associating a face image obtained by photographing and an avatar image.

At S20, specifically, a map image selected according to a photographing place and a photographing direction is acquired from the database in the camera or a database connected through communication, and a range selected on the basis of photographing information, such as an angle-of-view and a diaphragm, and information held by the map database, such as a landmark, is displayed on the screen as a map with the use of compass direction information held by the map image.

In this case, a subject is identified and an avatar is created. The position of the subject is determined according to a focus adjustment position and the like, and the avatar is combined and displayed at a corresponding position on the map. The photographing direction can be judged by a compass direction sensor. Therefore, if display is such that the photographing direction is set to the upper part of the map screen, display which is intuitively adjusted to the depth direction of photographing is possible. Thereby, it is possible to realize information display especially attaching importance to a direction a photographer gives attention to.

As described above, the digital camera 1 is set to the AR display mode by the user P operating the operation section 20a of the body section 2 or the operation section 34 of the lens 3. The digital camera 1 changes angle-of-view, focusing and diaphragm information about the lens 3, which are lens conditions, by the user P operating the operation section 20a of the body section 2 or the operation section 34 of the lens 3. The digital camera 1 is adapted to display information related to a subject on the display screen 18a in response to an operation of the operation section 20a of the body section 2 or the operation section 34 (a ring operation section) of the lens 3. Therefore, the user P can set the AR display mode or change the lens conditions by an action of supporting the operation section 34 of the lens 3 to stabilize the digital camera 1 at the time of photographing.

Thereby, it is possible to perform an operation attaching importance to holding of the camera. However, photographing operations such as a lens operation is not necessarily to be performed with the lens section. The photographing operations may be performed with the camera body if concentration to photographing is not interfered. As for the operation of the lens section, it is also possible to provide a push switch or a slide switch for the lens section in addition to a ring-type operation section and use the switch to perform the operation.

Here, the flowchart shows that S20 is executed after photographing. However, S20 may be executed at S18 or at a subsequent step. Thereby, map display can be confirmed before photographing.

As described above, the digital camera 1 displays information related to a subject on the display screen 18a according to angle-of-view, focus and diaphragm information about the lens 3 in addition to position information and compass direction information. In the case of a lens-exchangeable camera, display according to the characteristics of a fixed lens is possible.

Thus, according to the photographing apparatus of the present embodiment, it is possible to appropriately display information related to a subject by considering a user's photographing operation.

Second Embodiment

Next, a second embodiment of the present invention will be described.
(Configuration)

A photographing apparatus according to the second embodiment has a moon photographing mode for photographing "the moon" as a subject. Components of the photographing apparatus according to the second embodiment are almost the same as the components of the photographing apparatus described in the first embodiment. Therefore, the photographing apparatus according to the second embodiment will be described mainly with regard to components different from the components of the photographing apparatus of the first embodiment.

Figure 9:
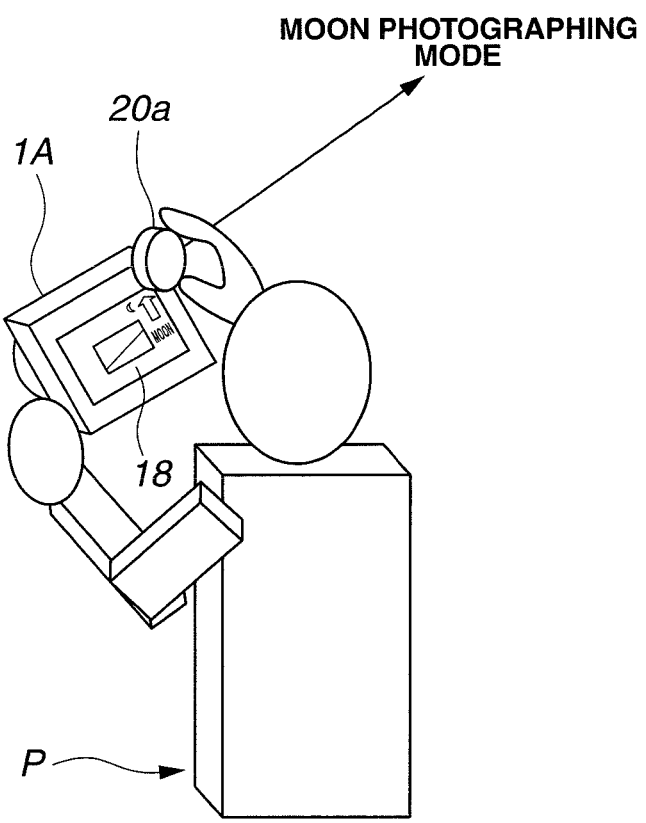
FIG. 9 is a diagram for illustrating a state where a user P switches to a moon photographing mode, according to a second embodiment of the present invention.

FIG. 9 is a diagram for illustrating a state that a user P switches to a moon photographing mode.

As shown in FIG. 9, the user P changes setting of a digital camera 1A to the moon photographing mode by operating an operation section 20a, holding the digital camera 1A in his or her hand.

Figure 10A:
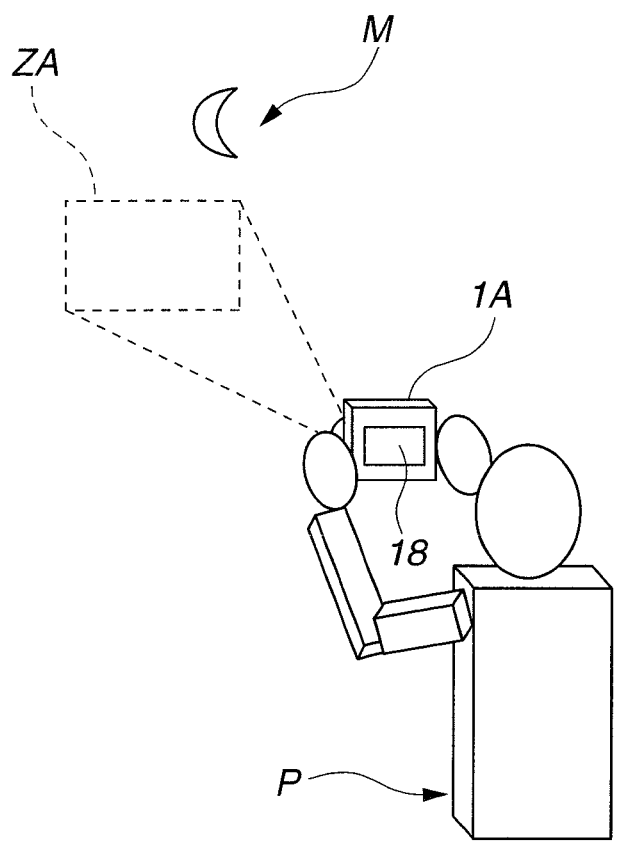
FIG. 10A is a diagram for illustrating a case where the user P photographs the moon by zooming a lens 3.
Figure 10B:
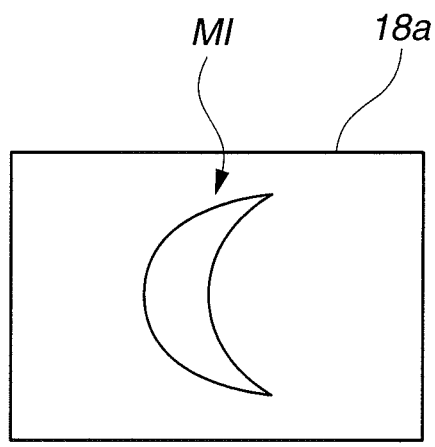
FIG. 10B is a diagram for illustrating a case where the user P photographs the moon by zooming the lens 3.
Figure 10C:
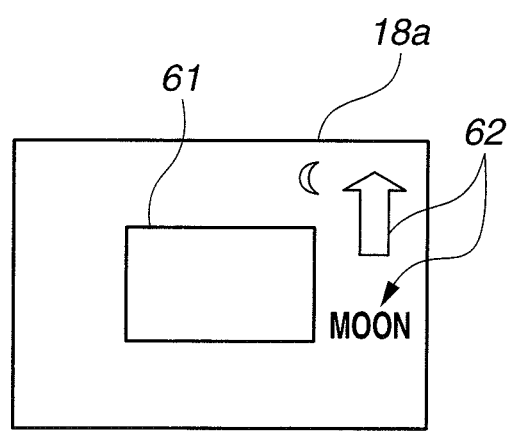
FIG. 10C is a diagram for illustrating a case where the user P photographs the moon by zooming the lens 3.

FIGS. 10A to 10C are diagrams for illustrating a case where the user P photographs the moon by zooming a lens 3.

As shown in FIG. 10A, when the user P photographs the moon M, holding the digital camera 1A in his or her hand, the user P adjusts the direction of the lens 3 of the digital camera 1A looking at a display screen 18a of a display section 18.

As shown in FIG. 10B, the user P zooms the lens 3 or changes the lens 3 to a telephoto lens in order to photograph the moon M large. In FIG. 10A, a broken-line frame indicates a photographing range ZA targeted by the zooming by the user P.

However, it is not easy for the user P to adjust the direction of the digital camera 1A to locate the moon M almost at the center in a narrow angle of view so as to display a moon image MI on the display screen 18a as shown in FIG. 10B.

In this case, a photographing frame 61 corresponding to the photographing range ZA is displayed on the display screen 18a, and AR information 62 indicating the direction the moon M is displayed outside the photographing frame 61, as shown in FIG. 10C.

Track information about the moon M according to date and time, and place is recorded in a database 16a in order to detect the AR information 62 indicating the direction of the moon M. When the user P switches to the moon photographing mode, a GPS section 17, a direction judging section 19 and a motion judging section 15 detects the position, compass direction and elevation angle of the digital camera 1A, respectively.

A signal processing and control section 11 detects the current position of the moon M on the basis of the track information about the moon M according to date and time, and place recorded in the database 16a, position information, compass direction information and elevation angle information about the digital camera 1A, and judges whether or not the moon M is within the photographing range ZA.

The signal processing and control section 11 may be adapted to detect the current position of the moon M and judge whether or not the moon M is within the photographing range ZA by transmitting the position information about the digital camera 1A and observation direction information about the digital camera 1A detected from the compass direction information and the elevation angle information, to the Internet via a communication section 13, and receiving celestial-body-in-observation-direction information via the Internet.

When the signal processing and control section 11 judges that the moon M is not within the photographing range ZA, the signal processing and control section 11 detects the position of the moon M relative to the photographing frame 61 and detects the AR information 62 indicating the direction of the moon M.

The detected AR information 62 indicating the direction of the moon M is superimposed outside the photographing frame 61 by a display control section 11b and displayed on the display screen 18a of the display section 18.

By recoding date-and-time and place information about a celestial body other than the moon M in the database 16a and calculating the track of the celestial body, the moon photographing mode can be applied to the celestial body other than the moon. The moon photographing mode is not limited to a celestial body. For example, the direction of a certain building or the like may be superimposed outside the photographing frame 61 and displayed on the display screen 18a as the AR information. In the case other than a celestial body, processing can be performed on the assumption that the elevation angle is 0, and the elevation angle information is not necessarily to be acquired. By using an image pattern in the photographing screen, for example, by detecting the ratio of ground to sky, information corresponding to an elevation angle may be obtained. By referring to the arrangement and height of each building, positions at which the AR information is to be given may be adjusted.

(Process)

Figure 11:
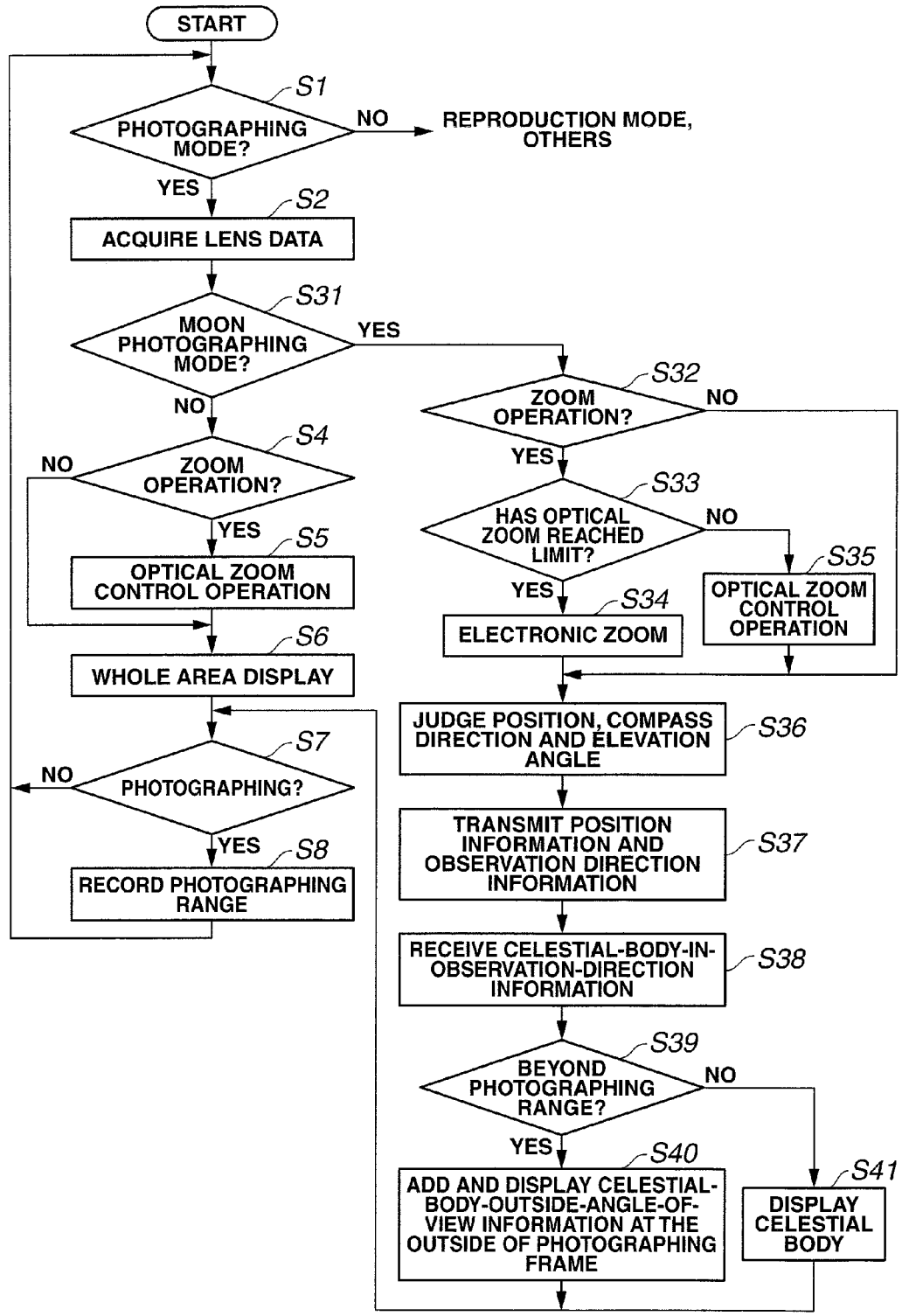
FIG. 11 is a flowchart showing an example of a process flow of the digital camera 1A at the time of the moon photographing mode.

Next, a process performed by the digital camera 1A at the time of the moon photographing mode will be described. FIG. 11 is a flowchart showing an example of a process flow of the digital camera 1A at the time of the moon photographing mode. The process of FIG. 11 is executed by a CPU of the signal processing and control section 11. A program for the process of FIG. 11 is recorded in a ROM (not shown) in the signal processing and control section 11. In FIG. 11, processing similar to that in FIG. 8 is given the same reference numeral, and description thereof will be omitted.

If it is judged by the processing at S1 that the photographing mode is set, and lens data is acquired by the processing at S2, the CPU, judges whether the moon photographing mode is set or not (S31).

If the digital camera 1A is not set to the moon photographing mode (S31: NO), the CPU performs the processes from S4 to S8 similarly to FIG. 8. If the digital camera 1A is set to the moon photographing mode (S31: YES), the CPU, judges whether a zoom operation has been performed or not (S32). If a zoom operation has been performed (S32: YES), the CPU judges whether optical zoom has reached its limit or not (S33). If optical zoom has reached the limit (S33: YES), the CPU executes electronic zoom (S34). If optical zoom has not reached the limit (S33: NO), the CPU executes an optical zoom control operation (S35).

At and after the processing at S34, or when a zoom operation has not been performed (S32: NO), the CPU, judges the position, compass direction and elevation angle of the digital camera 1A (S36). The CPU transmits position information and observation direction information about the digital camera 1A to the Internet from the judged position, compass direction and elevation angle (S37) and receives celestial-body-in-observation-direction information from the Internet (S38). The CPU judges whether a photographing target celestial body is beyond the photographing range or not, from the received celestial-body-in-observation-direction information (S39). If the celestial body is beyond the photographing range (S39: YES), the CPU adds and displays celestial-body-outside-angle-of-view information (AR information) at the outside of the photographing frame (S40) and transitions to the processing at S7. If the celestial body is not beyond the photographing range (S39: NO), the CPU displays the celestial body (S41) and transitions to the processing at S7.

As described above, the digital camera 1A can display information related to a subject in the photographing frame 61.

Third Embodiment

Next, a third embodiment of the present invention will be described.

(Configuration)

A photographing apparatus according to the third embodiment is adapted to perform control to add a strain to a superimposed image (information related to a subject) according to an aberration condition of a lens 3. Components of the photographing apparatus according to the third embodiment are almost the same as the components of the photographing apparatus described in the first embodiment. Therefore, the photographing apparatus according to the third embodiment will be described mainly with regard to components different from the components of the photographing apparatus of the first embodiment.

Figure 12A:
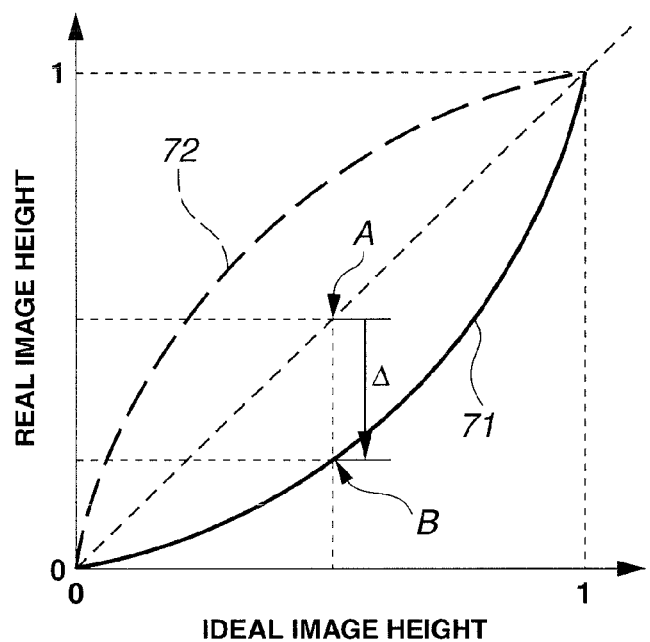
FIG. 12A is a diagram for illustrating a strain characteristic and image data according to a third embodiment of the present invention.
Figure 12B:
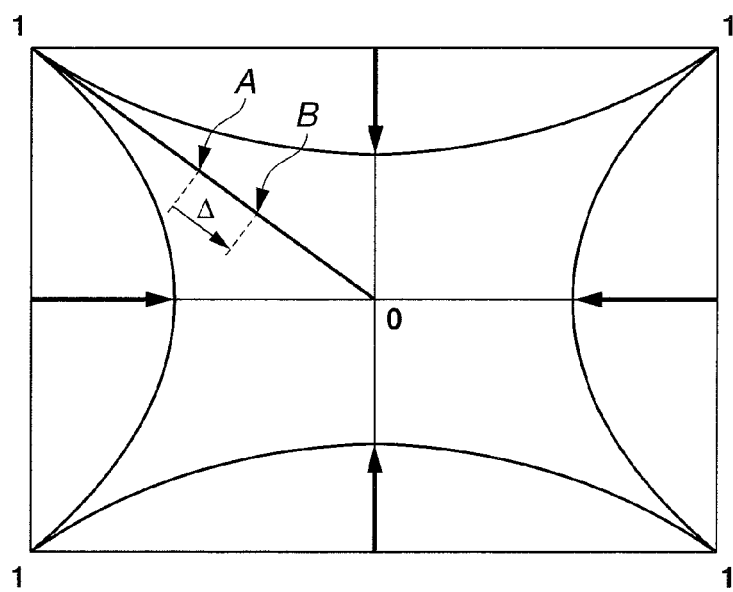
FIG. 12B is a diagram for illustrating a strain characteristic and image data according to the third embodiment of the present invention.

FIGS. 12A and 12B are diagrams for illustrating a strain characteristic and image data.

In FIG. 12A, an image height indicates a distance from the center of an image, and the center and four corners of image data shown in FIG. 12B are 0 and 1, respectively. An ideal image height indicates the image height of an ideal image without a strain, and a real image height indicates the image height of an image which has been actually taken and includes a strain.

Reference numeral 71 in FIG. 12A denotes an example of a characteristic in the case of a bobbin-type strain, and reference numeral 72 denotes an example of a characteristic in the case of a barrel-type strain.

In FIG. 12A, an image at a middle point A on a diagonal line is shown at a point B in the characteristic example of the bobbin-type strain. Accompanying this, the image at the middle point A on the diagonal line is shown at the point B in the image data in FIG. 12B.

Figure 13A:
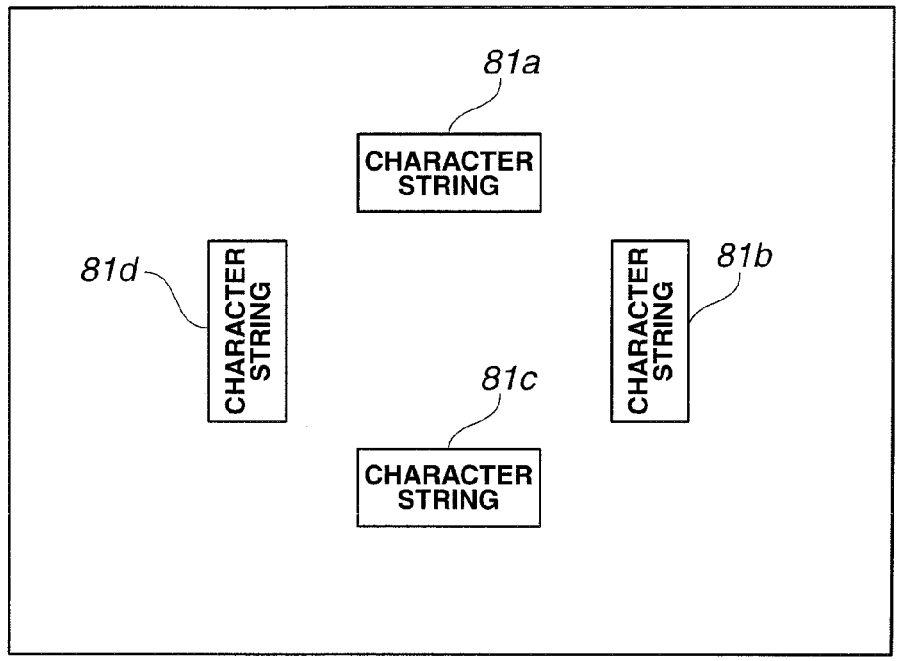
FIG. 13A is a diagram for illustrating an example of adding a strain to a superimposed image according to a strain characteristic.
Figure 13B:
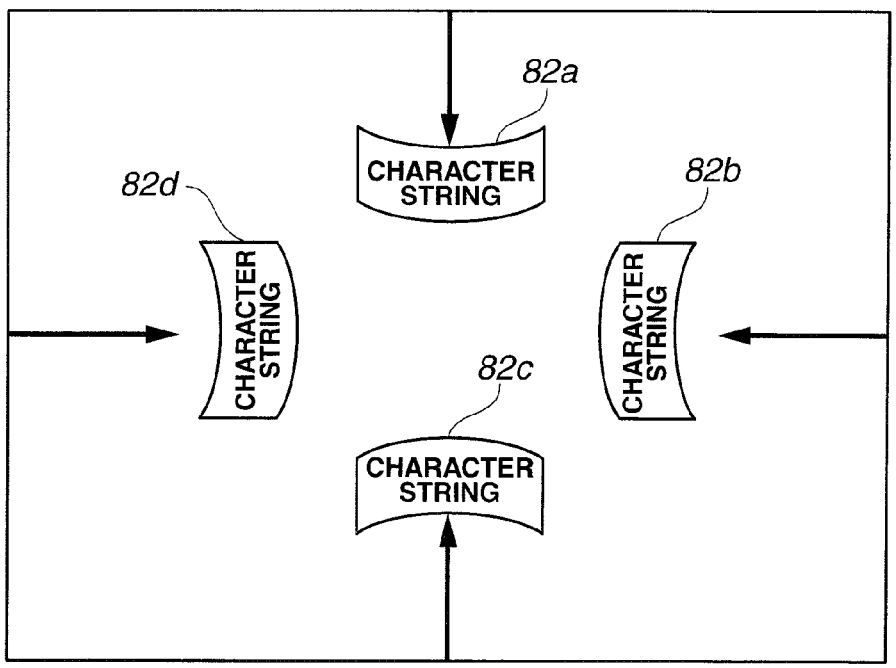
FIG. 13B is a diagram for illustrating an example of adding a strain to a superimposed image according to a strain characteristic.

FIGS. 13A and 13B are diagrams for illustrating an example of adding a strain to a superimposed image according to a strain characteristic.

As shown in FIG. 13A, a signal processing and control section 11 detects character strings for explaining subjects, that is, superimposed images 81a to 81d to be combined with the subjects similarly to the first embodiment.

The signal processing and control section 11 acquires strain characteristics according to zoom positions, from the lens 3. The signal processing and control section 11 adds strains to the superimposed images 81a to 81d according to the acquired strain characteristics. Thereby, superimposed images 82a to 82d to which the strains are added according to the strain characteristics according to the positions in the screen are generated.

The signal processing and control section 11 combines a photographing image with the superimposed images 82a to 82d to which the strains are added. The combined image generated by the combination is displayed on a display screen 18a by a display control section 11b.

The signal processing and control section 11 performs strain correction of the combined image as needed. By performing strain correction of the combined image, the photographing image and the superimposed images 82a to 82d can have equal strain characteristics.

Figure 14:
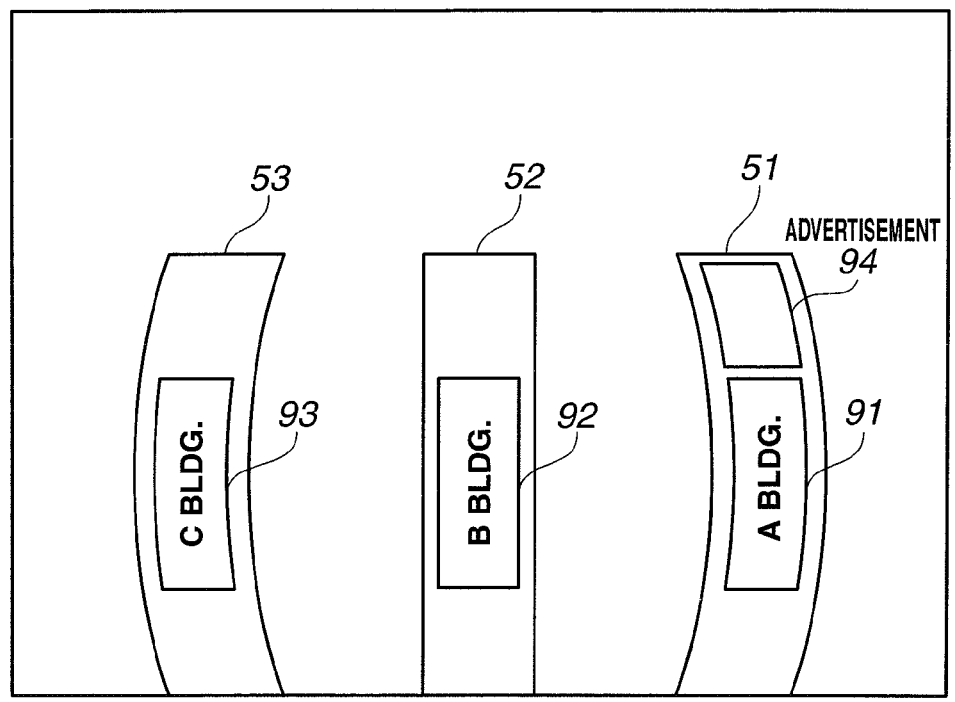
FIG. 14 is a diagram for illustrating a photographing image and superimposed images in the case of a barrel type strain.

FIG. 14 is a diagram for illustrating a photographing image and superimposed images in the case of the barrel type strain.

As shown in FIG. 14, the signal processing and control section 11 adds strains to the superimposed images according to barrel type strain characteristics and combines superimposed images 91 to 93 to which the strains are added with A Building 51, B Building 52 and C Building 53, respectively. The signal processing and control section 11 can also add a strain to an advertisement displayed on a sign 94 as a superimposed image according to a strain characteristic.

(Process)

Figure 15:
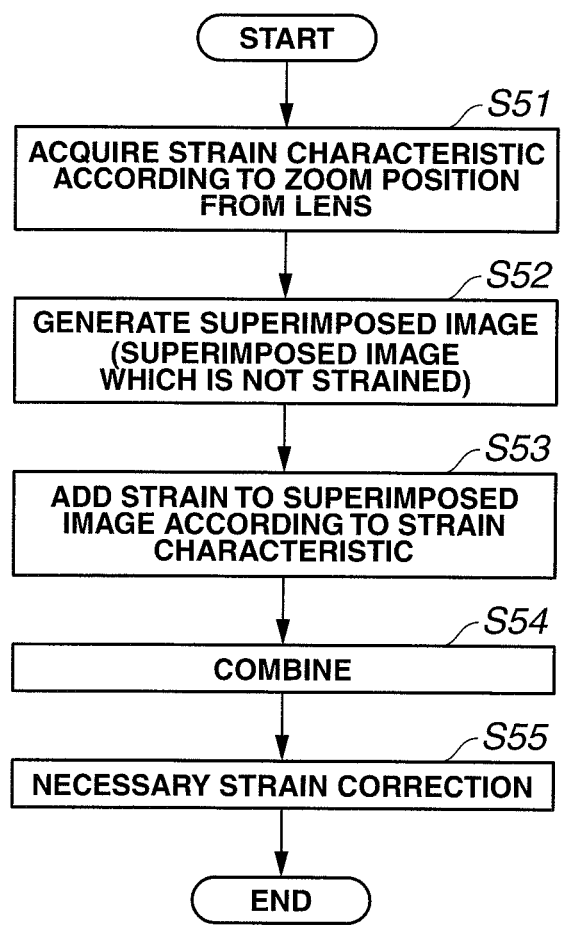
FIG. 15 is a flowchart showing an example of the flow of a process of adding a strain to a superimposed image according to a strain characteristic.

Next, a process for adding a strain to a superimposed image according to a strain characteristic (a strain giving process) will be described. FIG. 15 is a flowchart showing an example of the flow of the process of adding a strain to a superimposed image according to a strain characteristic. The process of FIG. 15 is executed by a CPU of the signal processing and control section 11. A program for the process of FIG. 15 is recorded in a ROM (not shown) in the signal processing and control section 11.

First, the CPU acquires a strain characteristic according to a zoom position, from the lens 3 (S51) and generates a superimposed image (S52). When generating the superimposed image, the CPU generates the superimposed image which is not strained. The CPU adds a strain to the superimposed image (AR information) according to the strain characteristic (S53) and combines a subject image and the superimposed image to which the strain is added, with each other (S54). The CPU performs necessary strain correction (S55) and ends the process. In this case, a position at which the superimposed image is to be combined is determined on the basis of the appearance or contour of a building. For example, by performing control so as to display a sign at the boundary between the sky and the roof part of a building or from the contours of buildings, real and virtual information may be mixed.

As described above, since a digital camera 1B adds a strain to a superimposed image according to a strain characteristic due to aberration of the lens 3, a user P can recognize a photographing image without an uncomfortable feeling. According to this invention, superimposed display changes from moment to moment in response to operations of the photographing lens, and optimum display suitable for the user's interest and expectation is shown. It is possible to perform photographing, thinking of an effective angle of view, a composition and a photographing place while seeing the optimum display. This information may be photographed together or may be given in an image file so that it may be read out later.

As for the steps in each of the flowchart in the present specification, the execution order may be changed, multiple steps may be executed at the same time, or the steps may be executed in a different order for each execution, as far as the execution does not go against the nature of the steps.

The present invention is not limited to the embodiments described above, and various changes, alterations and the like are possible within a range not departing from the spirit of the present invention. Forms shown in the following appended items are possible for the photographing apparatus of the present invention.

(Appended Item 1)

A photographing apparatus capable of changing a photographing condition, the apparatus including:

a display section displaying a through image or a photographing image;

a control section acquiring photographing information related to the inside of a photographing screen and surroundings of the photographing screen, from a database on the basis of position information and compass direction information about the photographing apparatus; and a display control section selecting information according to the photographing condition, from the photographing information acquired according to the photographing condition and displaying the selected information by superimposing the selected information on an image displayed on the display section.

(Appended Item 2)

The photographing apparatus according to the appended item 1, wherein the photographing condition is information based on operations and settings related to photographing by the photographing apparatus.

(Appended Item 3)

The photographing apparatus according to the appended item 1, wherein the photographing condition is at least one of a focus condition, an angle-of-view condition, a diaphragm condition, an aberration condition, a focus adjustment setting condition and an exposure adjustment setting condition.

(Appended Item 4)

The photographing apparatus according to the appended item 1, wherein the control section detects a photographing direction on the basis of the position information and the compass direction information; and the display control section displays information indicating the photographing direction on the display section.

(Appended Item 5)

The photographing apparatus according to the appended item 3, wherein the control section performs strain giving processing on the photographing information selected according to the aberration condition; and the display control section displays the photographing information which has received the strain giving processing, on the display section.

(Appended Item 6)

The photographing apparatus according to the appended item 3, wherein the display control section displays the photographing information selected according to a photographer's attention condition in the photographing screen, on the display section.

(Appended Item 7)

The photographing apparatus according to the appended item 6, wherein the photographer's attention condition is the focus condition; and the display control section selects information related to a focused area in the photographing screen, from the photographing information and displays the information on the display section.

(Appended Item 8)

The photographing apparatus according to the appended item 6, wherein the photographer's attention condition is the angle-of-view condition; and if the angle of view is set closer to the telephoto side than specified, the display control section selects information related to a central area in the photographing screen from the photographing information and displays the information on the display section.

(Appended Item 9)

The photographing apparatus according to the appended item 6, wherein the photographer's attention condition is the focus adjustment setting condition; and if the photographer selects a predetermined area from multiple focus adjustment areas in the photographing screen, the display control section selects information related to the focus adjustment area in the photographing screen selected by the photographer from the photographing information and displays the information on the display section.

(Appended Item 10)

The photographing apparatus according to the appended item 6, wherein the photographer's attention condition is the exposure adjustment setting condition; and if the photographer selects a predetermined area from multiple photometric areas in the photographing screen, the display control section selects information related to the photometric area in the photographing screen selected by the photographer from the photographing information and displays the information on the display section.

(Appended Item 11)

The photographing apparatus according to the appended item 3, wherein the control section generates viewpoint information, information from a viewpoint different from a viewpoint of the photographer, from the photographing information on the basis of the position information, the compass direction information and the diaphragm condition; and the display control section displays the generated viewpoint information by superimposing the viewpoint information on the image displayed on the display section.

(Appended Item 12)

The photographing apparatus according to the appended item 11, wherein the viewpoint information is map information;

the control section slices a predetermined range from map information included in the photographing information on the basis of the position information, the compass direction information and the diaphragm condition; and the display control section displays the sliced map information by superimposing the sliced map information on the image displayed on the display section.

(Appended Item 13)

The photographing apparatus according to the appended item 12, wherein the control section detects a photographing direction on the basis of the position information and the compass direction information; and the display control section displays the sliced map information by superimposing the sliced map information on the image displayed on the display section so that the photographing direction is at an upper part of the display section.

(Appended Item 14)

The photographing apparatus according to the appended item 12, wherein if the photographing information includes avatar information related to the inside of the photographing screen and surroundings of the photographing screen, the control section combines the avatar information with the map information; and the display control section displays the combined map information by superimposing the combined map information on the image displayed on the display section.

(Appended Item 15)

A photographing apparatus capable of changing a photographing condition for photographing a subject, such as a lens condition and an exposure condition, the apparatus including:

a display section displaying a photographing image showing the subject;

a control section reading out simple map information obtained by slicing a predetermined range from map information recorded in a database or a map prepared by a neighboring public institution or company, which is recorded in a database, on the basis of position information and compass direction information about the photographing apparatus; and a display control section performing control so as to display the read-out simple map information on the display section by superimposing the read-out simple map information on the photographing image.

What is claimed is:

1. A photographing apparatus displaying information related to a subject and capable of changing a lens condition for photographing the subject, the apparatus comprising:

a display section displaying a photographing image showing the subject;

a control section reading out information related to the subject and information related to surroundings of the subject from a database on the basis of position information and compass direction information about the photographing apparatus; and a display control section judging, according to a depth of field that changes according to the lens condition, whether or not the subject exists within a distance width added with the depth of field and performing control so as to display the information related to the subject judged to exist within the distance width on the display section by superimposing the information on the photographing image.

2. The photographing apparatus according to claim 1, wherein
the control section reads out map information in a predetermined range from map information recorded in the database on the basis of a depth of field in addition to the position information and the compass direction information; and
the display control section performs control so as to display the read-out map information in the predetermined range on the display section by superimposing the read-out map information in the predetermined range on the photographing image.

3. The photographing apparatus according to claim 2, wherein
the control section judges whether or not avatar information related to the subject is recorded in the database and, if the control section judges that the avatar information is recorded in the database, reads out the avatar information from the database; and
the display control section combines the read-out avatar information with the map information in the predetermined range and performs control so as to display the combined avatar information and map information in the predetermined range on the display section by superimposing the combined avatar information and map information on the photographing image.

4. The photographing apparatus according to claim 1, comprising an object recognizing section recognizing an object with use of the photographing image; wherein
the display control section performs control so as to display the information related to the subject judged to exist within the distance width on the display section after transforming the information to be fit for a shape recognized by the object recognizing section.

5. The photographing apparatus according to claim 1, wherein
the control section reads out a simple airborne image obtained by slicing a predetermined range from an airborne image recorded in the database on the basis of the position information, the compass direction information and the lens condition; and
the display control section performs control so as to display the read-out simple airborne image on the display section by superimposing the read-out simple airborne image on the photographing image.

6. The photographing apparatus according to claim 1, wherein
the control section generates a bird's-eye view image looking down in a photographing direction from a photographing point, from an airborne image recorded in the database on the basis of the position information, the compass direction information and the lens condition; and
the display control section performs control so as to display the bird's-eye view image generated by the control section on the display section by superimposing the bird's-eye view image on the photographing image.

7. The photographing apparatus according to claim 1, wherein the lens condition is information obtained on the basis of an operation of a lens operating section.

8. The photographing apparatus according to claim 1, wherein the lens condition is at least one of a focus condition, an angle-of-view condition, a diaphragm condition and an aberration condition.

9. The photographing apparatus according to claim 8, wherein the display control section performs control so as to display the information related to the subject judged to exist within the distance width on the display section after performing strain giving processing on the information according to the aberration condition.

10. The photographing apparatus according to claim 1, wherein
the control section detects a direction of the subject on the basis of the position information and the compass direction information; and
the display control section performs control so as to display information indicating the direction of the subject on the display section.

11. A photographing method displaying information to a subject, the method being for a photographing apparatus capable of changing a lens condition for photographing the subject, the method comprising:
a display step of displaying a photographing image showing the subject, on a display section;
a control step of reading out information related to the subject and information related to surroundings of the subject from a database on the basis of position information and compass direction information about the photographing apparatus; and
a display control step of judging, according to a depth of field that changes according to the lens condition, whether or not the subject exists within a distance width added with the depth of field and performing control so as to display the information related to the subject judged to exist within the distance width on the display section by superimposing the information on the photographing image.

12. The photographing method according to claim 11, wherein
the control step reads out map information in a predetermined range from map information recorded in the database on the basis of a depth of field in addition to the position information and the compass direction information; and
the display control step performs control so as to display the read-out map information in the predetermined range on the display section by superimposing the read-out map information in the predetermined range on the photographing image.

13. The photographing method according to claim 12, wherein
the control step judges whether or not avatar information related to the subject is recorded in the database and, if the control step judges that the avatar information is recorded in the database, reads out the avatar information from the database; and
the display control step combines the read-out avatar information with the map information in the predetermined range and performs control so as to display the combined avatar information and map information in the predetermined range on the display section by superimposing the combined avatar information and map information on the photographing image.

14. The photographing method according to claim 11, comprising an object recognizing step of recognizing an object with use of the photographing image; wherein the display control step performs control, so as to display the information related to the subject judged to exist within the distance width on the display section after transforming the information to be fit for a shape recognized by the object recognizing step.

15. The photographing method according to claim 11, wherein the control step reads out a simple airborne image obtained by slicing a predetermined range from an airborne image recorded in the database on the basis of the position information, the compass direction information and the lens condition; and the display control step performs control so as to display the read-out simple airborne image on the display section by superimposing the read-out simple airborne image on the photographing image.

16. The photographing method according to claim 11, wherein the control step generates a bird's-eye view image looking down in a photographing direction from a photographing point, from an airborne image recorded in the database on the basis of the position information, the compass direction information and the lens condition; and the display control step performs control so as to display the bird's-eye view image generated by the control step on the display section by superimposing the bird's-eye view image on the photographing image.

17. The photographing method according to claim 11, wherein the lens condition is at least one of a focus condition, an angle-of-view condition, a diaphragm condition and an aberration condition.

18. The photographing method according to claim 17, wherein the display control step performs control so as to display the information related to the subject judged to exist within the distance width on the display section after performing strain giving processing on the information according to the aberration condition.

* * * * *